US008000956B2

(12) United States Patent
Brun et al.

(10) Patent No.: US 8,000,956 B2
(45) Date of Patent: Aug. 16, 2011

(54) SEMANTIC COMPATIBILITY CHECKING FOR AUTOMATIC CORRECTION AND DISCOVERY OF NAMED ENTITIES

(75) Inventors: Caroline Brun, Grenoble (FR); Caroline Hagege, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 834 days.

(21) Appl. No.: 12/028,126

(22) Filed: Feb. 8, 2008

(65) Prior Publication Data

US 2009/0204596 A1    Aug. 13, 2009

(51) Int. Cl.
G06F 17/28    (2006.01)

(52) U.S. Cl. .................. 704/9; 704/5; 382/229

(58) Field of Classification Search ............. 704/9, 5; 382/229

See application file for complete search history.

(56) References Cited

U.S. PATENT DOCUMENTS

| | | | |
|---|---|---|---|
| 6,311,152 B1 | 10/2001 | Bai et al. | |
| 6,975,766 B2 | 12/2005 | Fukushima | |
| 7,058,567 B2 | 6/2006 | Aït-Mokhtar et al. | |
| 7,171,350 B2 | 1/2007 | Lin et al. | |
| 2007/0179776 A1 | 8/2007 | Segond et al. | |

OTHER PUBLICATIONS

McDonald, "Internal and External Evidence in the Identification and Semantic Categorization of Proper Names" in "Corpus Processing for Lexical Acquisition" 1996, pp. 21-39, MIT Press.*
Fleischman, "Fine grained classification of named entities" in Proc. of 1f9th INternational Conference on Computational Linguistics 2002, pp. 1-7.*
Mikheeve, "Named Entity Recognition without Gazetteers" in Proceedings of the Ninth Conference of the European Chapter of the Association for Computational Linguistics, 1999, pp. 1-8.*
U.S. Appl. No. 11/846,740, filed Aug. 29, 2007, Brun, et al.
S.Aït-Mokhtar, et al., *Robustness Beyond Shallowness: Incremental Dependency Parsing, In a Special Issue of the NLE Journal*, 2002.
C.Brun, et al., *Intertwining Deep Syntactic Processing and Named Entity Detection. ESTAL*, Alicante, Spain, Oct. 20-22, 2004.
C.Hagege, et al., *Entre syntaxe et sémantique: Normalisation de l'analyse syntaxique en vue de l'amélioration de l'extraction d'information, Proceedings TALN*, Batz-sur-Mer, France, 2003, (Abstract).
Ait-Mokhtar, et al., *Subject and Object Dependency Extraction Using Finite-State Transducers, Proceedings ACL'97 Workshop on Information Extraction and the Building of Lexical Semantic Resources for NLP Applications*, Madrid, Jul. 1997.
Ait-Mokhtar, et al,. *Incremental Finite-State Parsing, Proceedings of Applied Natural Language Processing*, Washington, Apr. 1997.

(Continued)

*Primary Examiner* — Vincent P Harper
(74) *Attorney, Agent, or Firm* — Fay Sharpe LLP

(57) ABSTRACT

A computer implemented system and method for processing text are disclosed. Partially processed text, in which named entities have been extracted by a standard named entity system, is processed to identify attributive relations between a named entity or proper noun and a corresponding attribute. A concept for the attribute is identified and, in the case of a named entity, compared with the named entity's context, enabling a confirmation or conflict between the two to be determined. In the case of a proper name, the attribute's context can be associated with the proper name, allowing the proper name to be recognized as a new named entity.

23 Claims, 3 Drawing Sheets

OTHER PUBLICATIONS

Beneti, et al., *Automatic Generation of Fine-Grained Named Entity Classification*, (2006) http://www.ifarm.nl/erikt/ltp2006/ltp2006.pdf.

Lee., et al., *A Bootstrapping Approach for Geographic Named Entity Annotation*, (2005) http://hri.kaist.ac.kr/publications/22gblee1e.pdf.

Negri, et al., *Using WordNet Predicates for Multilingual Named Entity Recognition*, (2004) http://fi.muni.cz/gwc2004/proc/102.pdf.

Humphreys, et al., *University of Sheffield: Description of the LaSIE-II System as Used for MUC-7*, in Proc. Sixth Message Understanding Conference (MUC-6), pp. 207-220, University of Sheffield, 1995.

Borthwick, et al., *NYU: Description of the MENE Named Entity System as Used in MUC-7*, in Proc. Seventh Message Understanding Conference, Fairfax, VA, 1998.

Magnini, et al., *A WordNet-Based Approach to Named Entities Recognition*, International Conference on Computational Linguistics COLING-02 on SEMANET, vol. 11, pp. 1-7 (2002).

Brun, et al., *XRCE-M a Hybrid System for Named Entity Metonymy Resolution*, ACL-SemEval 2007, 4th International Workshop on Semantic Evaluations, Prague, Jun. 23-24, 2004.

\* cited by examiner

SEMANTIC COMPATIBILITY CHECKING FOR AUTOMATIC CORRECTION AND DISCOVERY OF NAMED ENTITIES

CROSS REFERENCE TO RELATED PATENTS AND APPLICATIONS

The following reference, the disclosure of which are incorporated herein in its entirety by reference, is mentioned:

Application Ser. No. 11/846,740, filed Aug. 29, 2007, entitled A HYBRID SYSTEM FOR NAMED ENTITY RESOLUTION, by Caroline Brun, et al.

BACKGROUND

The exemplary embodiment relates to text processing. It finds particular application in the context of assessing whether text elements have been correctly classified as named entities and identifying previously unclassified text elements as named entities.

A named entity is a group of one or more words (a text element) that identifies an entity by name. For example, named entities may include persons (such as a person's given name or role), organizations (such as the name of a corporation, institution, association, government or private organization), locations (such as a country, state, town, geographic region, or the like), artifacts (such as names of consumer products, such as cars), specific dates, and monetary expressions. Named entities are typically capitalized in use to distinguish the named entity from an ordinary noun.

Named entities are of great interest for the task of information extraction in general, and for many other text processing applications. Identifying a group of words as a named entity can provide additional information about the sentence in which it is being used. Techniques for recognizing named entities in text typically rely on a lexicon which indexes entries that are named entities as such, and may further apply grammar rules, such as requiring capitalization, or use statistical analysis, to confirm that the group of words should be tagged as a named entity. For example, the lexicon WordNet is an on-line resource which can be used to identify a group of words as forming a named entity. This lexicon also indexes the entries according to one or more of a set of semantic types. Lower level types are grouped together under supertypes.

Automated recognition of named entities in text is often difficult because the words which make up the named entity have more than one context, and thus have usage outside the named entity context. Many systems, symbolic or statistical, automatically spot and categorize named entities with a relatively good accuracy (90% or above on an f-scale). However, the accuracy which such systems provide is sometimes not sufficient for certain applications where an accuracy of 100% is sought. For example, for document anonymization, a single named entity remaining in a redacted text can render the entire anonymization process worthless. While manual correction of the automatically processed data can be used to identify named entities which the automated process has missed, it can be a tedious task and not invariably error free.

There remains a need for a substantially automated method and system capable of providing improvements in named entity recognition and correction.

INCORPORATION BY REFERENCE

The following references are incorporated herein by reference in their entireties:

U.S. Pat. No. 7,171,350, entitled METHOD FOR NAMED-ENTITY RECOGNITION AND VERIFICATION, by Lin, et al. discloses method for detection of named entities. Segments to be tested are extracted from an article according to a text window, and parsed with a predefined grammar to remove ill-formed ones. Then, a statistical verification model is used to calculate the confidence measurement of each segment to determine whether the segment has a named entity or not. If the confidence measurement is less than a predefined threshold, the segment will be rejected.

U.S. Pat. No. 6,975,766, entitled SYSTEM, METHOD AND PROGRAM FOR DISCRIMINATING NAMED ENTITY, by Fukushima, discloses a named entity discriminating system capable of discriminating names entities such as location names, personal names, and organization names in text single text analyzing means analyzes each text read by the reading means and detects candidates for the named entity in the text. A complex text analyzing means estimates the likelihood of the candidate named entity detected by the single text analyzing means by an analysis with reference to referring link text or linked text of the text in which the candidate named entity appears.

U.S. Pat. No. 6,311,152, entitled SYSTEM FOR CHINESE TOKENIZATION AND NAMED ENTITY RECOGNITION, by Bai, et al. discloses a system for tokenization and named entity recognition of ideographic language is disclosed are also generally related to Named Entity recognition.

U.S. Pat. No. 7,058,567, entitled NATURAL LANGUAGE PARSER, by Aït-Mokhtar, et al. discloses a finite state parser which may be utilized in natural language processing.

U.S. Pub. No. 2007/0179776, by Segond, et al., discloses a system for retrieval of text which includes a processor which identifies grammar rules associated with text fragments of a text string that is retrieved from an associated storage medium, and retrieves text strings from the storage medium which satisfy the grammar rules. A user input device in communication with the processor enables a user to select text fragments of displayed text strings for generating a query. The processor identifies grammar rules associated with the user-selected text fragments and retrieves text strings from the storage medium which satisfy the grammar rules.

BRIEF DESCRIPTION

In accordance with one aspect of the exemplary embodiment, a method of processing text includes receiving processed text which has original information associated with it identifying text elements corresponding to named entities and their assigned contexts, the text comprising a text string. The method includes, for the text string, applying at least one grammar rule for identifying an attributive relationship between an attribute and a nominal entity in the text string. The nominal entity is at least one of an identified named entity having an assigned context and an identified proper name which is not identified in the original information as being a named entity. At least one concept for the attribute is identified. Where the nominal entity is a named entity, the method includes comparing the assigned named entity context with the at least one attribute context. The method further includes providing for new information to be associated with the text, which is based on at least one of the comparison and the identified context of an attribute which is identified as being in an attributive relationship with an identified proper name.

In another aspect, an apparatus for processing text includes an attribute identification component which, for a text string of received text which has information associated with it identifying text elements corresponding to named entities and their assigned contexts, applies at least one grammar rule for identifying an attributive relationship between an attribute and a nominal entity in the text string. The nominal entity is at least one of an identified named entity and an identified proper name which has not been identified as a named entity. A compatibility checker accesses an associated lexical ontology to identify at least one concept for the attribute that is identified as being in an attributive relationship with the entity and, in the case of a named entity, compares the at least one attribute context with the assigned context of the entity. An annotation component annotates the text, based on at least one of the comparison and the identified context of an attribute which is identified as being in an attributive relationship with an identified proper name.

In another aspect, a method of processing text includes processing text to form processed text which identifies named entities in the text and their corresponding contexts. For at least one text string in the processed text, the method includes applying at least one grammar rule for identifying an attributive relationship between an attribute and a nominal entity in the text string, the nominal entity being at least one of one of the identified named entities and an identified proper name which is not identified in the processed text as being a named entity. The method further includes identifying at least one concept for the attribute. Where the nominal entity is a named entity, the method includes comparing the named entity's context with the at least one attribute context. Where the nominal entity is one of a proper name and a named entity for which there is a conflict between the compared named entity's context with the at least one attribute context, the method includes associating information with the processed text based thereon.

DETAILED DESCRIPTION

Figure 1:
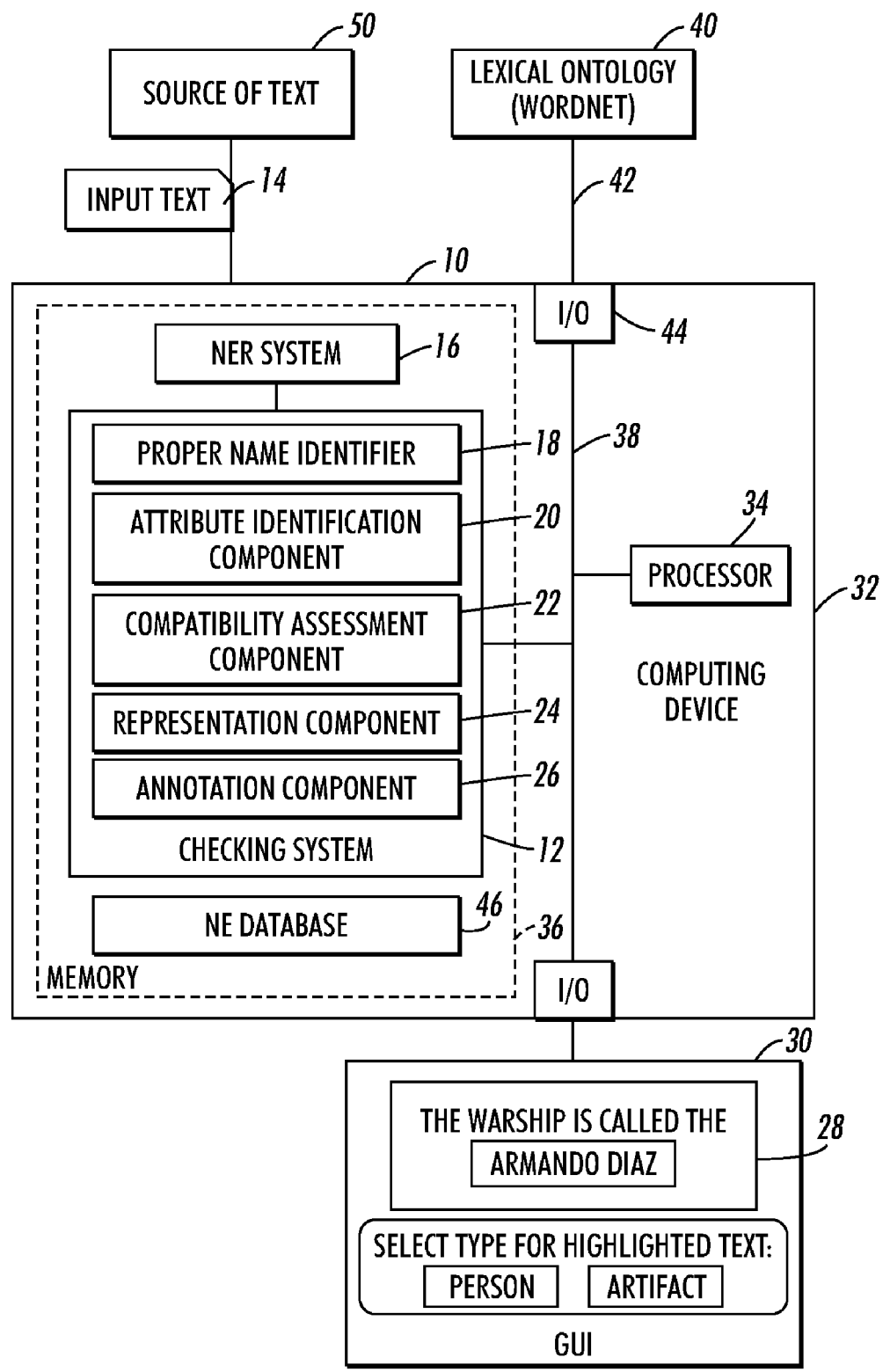
FIG. 1 is a functional block diagram of a text processing system in accordance with one aspect of the exemplary embodiment.

Aspects of the exemplary embodiment disclosed herein relate to a substantially or completely automated system, method, and computer program product for correcting errors and/or dynamically associating new types for Named Entity Recognition (NER) systems.

In one aspect, after named entities (NEs) and proper names (PNs) have been recognized in a text, semantic compatibility checking is performed on the results in order to confirm or to correct the responses given by the NER system and also to propose new named entity semantic types that were not previously recognized by the system. This semantic checking is performed using a semantic resource (e.g., lexical semantic ontology like WordNet) and the output of a refined syntactic analysis. As a result, the accuracy of NER systems is significantly improved. Moreover, the tag set for Named Entities (i.e., the set of contexts with which named entities can be tagged, as appropriate) is automatically enriched, which is particularly useful for adapting a general purpose NER system to a specific domain.

The exemplary system and method can thus be used for one or more of the following functions:

1. Spotting the errors that a NER system has made.
2. Proposing new NE semantic types that are not identified in the original tag set.
3 Proposing NE semantic types for proper nouns that have not been recognized by the NER system as named entities.
4 Confirming NE semantic typing that has been performed by the NER system.

Error spotting (Function 1) in NE recognition can be done in different ways, from an interactive error correcting process with the intervention of the user who can confirm the propositions of the system, to a fully automatic error recovering.

The second and third functions propose new tags when an error in entity recognition has been detected and when no available other tag can be used, or in a more general way, when a proper noun candidate that has not been recognized as a named entity is found (function 3).

Finally, the fourth function can be useful when a very high precision in NER is required, which can be obtained by this double-checking of NE typing (original system and semantic compatibility verification).

A text element, as used herein, can comprise a word or group of words which together form a part of a generally longer text string, such as a sentence, in a natural language, such as English or French. In the case of ideographic languages, such as Japanese or Chinese, text elements may comprise one or more ideographic characters.

A "named entity" (NE) generally comprises a text element which identifies an entity by name and which belongs to a given semantic type. For example, named entities may include persons, organizations, locations, artifacts, specific dates, and monetary expressions.

A "proper name," or proper noun, (PN) is a noun representing a unique entity, which has a unique referent in the world, as distinguished from common nouns which describe a class of entities. A proper name, as used herein, can be any text element which serves the function of a noun in a text string but which is not identified as being a common noun, for example, because it is capitalized and/or does not appear in a lexicon of common nouns, and is also not recognized as being a named entity. What differentiates a named entity from a proper name, as used herein, may be defined by whatever named entity recognition system and processing rules are employed to classify a text element as a named entity. A proper name can thus be considered as a text element that is a candidate new named entity. The expression "nominal entity" or "NE/PN" is used herein to refer to an identified named entity or proper name.

An "attribute" can be any text element identified as being in an attributive relation with an identified named entity or proper name by operation of one or more attributive relationship grammar rules. An attribute is generally a state of the named entity or proper name, e.g., what the named entity "is". In general, the attributes are nominal attributes, i.e., comprise a noun.

A "lexical ontology" can be any stored data structure which indexes text elements according to their meaning, and, in particular, enables attributes to be recognized according to their semantic type (or "context"). For example, the lexical ontology can be an external semantic resource or a locally stored database. WordNet is an exemplary on-line resource which can be used to identify contexts. The exemplary lexical ontology indexes the entries according to one or more of a set of semantic types which are related to the sense in which a word can be used in a given natural language. For entries classed as nouns (including single words and nominal phrases), WordNet classifies entries according to about 25 supertypes (the highest level of semantic types), with more discrete types of categorization being subsumed into these primary classes. Each of the WordNet supertypes can be used as a context for the exemplary system and method. As will be appreciated, the exemplary system and method are not limited to this particular set of contexts. For some applications, it may be appropriate for two or more of the lexical ontology's semantic types to be grouped into a single context. Further details on the WordNet lexical ontology are to be found in Christiane Fellbaum, Ed. "WordNet: An Electronical Lexical Database". MIT Press, Cambridge, USA (1998).

The exemplary system and method find particular application in the fields of information extraction, question answering, machine translation, and the like.

With reference to FIG. 1, a text processing apparatus 10 includes a semantic compatibility system 12 (hereinafter "checking system") for checking recognized named entities and discovery of new named entities in partially processed text. In general, the checking system 12 may include instructions for syntactically, semantically, and lexically analyzing the text content of the input documents and identifying attributes linked to named entities and proper names in the documents.

The text processing apparatus 10 receives text 14 as input, such as an electronic document in a natural language, such as English. A named entity recognition (NER) system 16 processes the input text to identify named entities in text strings, such as sentences, which together form the input text 14. The NER system 16 can be any suitable system which tags the identified named entities or otherwise annotates the text according to their context (e.g., PERSON, LOCATION, ORGANIZATION, DATES, etc.). The NER system 16 may be a part of the checking system 12 or separate therefrom, as shown.

The exemplary checking system 12 includes a number of text processing components 18, 20, 22, 24, 26 which may be in the form of modules or assembled into a single component. In particular, the checking system 12 includes a proper name identification component 18, an attribute identification component 20, a compatibility assessment component 22, optionally a representation component 24, and an annotation component 26. The proper name identification component 18 identifies proper names in the text (if this has not already been performed by the NER system 16). The identification may be in the form of tags or other information associated with the text 12. The proper names identified by the component 18 are those proper names which are not recognized as named entities by the NER system 16. The attribute identification component 20 identifies attributes that are syntactically linked to either an identified proper name or an identified named entity in the text strings. The compatibility assessment component 22 assesses the compatibility between a context assigned to an identified named entity (or proper name) and its linked identified attribute. The representation component 24 (in a semi-automated system) generates a representation 28 of the text string for display to a user on an associated user interface 30. The representation 28 may highlight identified named entities and/or candidate named entities, allowing a user to confirm or reject their designations. The annotation component 26 annotates the text, based on the compatibility assessment, with information concerning the previously identified named entities and proper names identified as candidate named entities. The details of the processing components 18, 20, 22, 24, 26 are best understood with reference to the method, described in detail below, and will only be described briefly here.

The various processing components 18, 20, 22, 24, 26 of the checking system 12 and NER system 16 may be embodied in software, hardware, or both. In one embodiment, the processing components 16, 18, 20, 22, 24, 26 are hosted by a computing device 32. The computing device 32 can be any device which is capable of performing the steps of the document annotation method outlined in FIG. 2, such as a general purpose computer, e.g., a desktop PC, a laptop PC, a workstation, a server, or a mainframe computer, or a dedicated computing device, and having a processor 34 and associated memory 36, on which the processing components are loaded as software. In general, the processor 34 executes the instructions, stored in memory 36, for performing the exemplary method described below. Components of the system are connected by a data/control bus 38. In one embodiment, the processing components 18, 20, 22, 24, 26 and NER system 16 may form a part of a natural language parser.

The checking system 12 accesses a lexical ontology 40, which may be linked to the computing device by a suitable wired or wireless link 42, such as the Internet. Alternatively, the lexical ontology may be stored locally in memory, such as memory 36. Additionally, a named entity database 44, which may be at least partially built from new named entities identified by the system 12, includes named entities indexed according to context, and may be utilized by the NER system 16.

While the exemplary checking system 12 is illustrated as being physically located on a single computing device 32, it is to be appreciated that components or subcomponents of the system 12 may be remote from one another, e.g., on a client and server.

A document source 50 is arranged to provide text 14, which is to be processed by the checking system 12, to the computing device 32. Source 50 may be a general purpose computer, e.g., a desktop computer, laptop, or the like, a dedicated computing device, a memory storage device, a server, a scanner, a facsimile machine, or any other device capable of providing a document for processing. The text to be input to the device 30 may be stored electronically, e.g., on disk or other portable storage medium or may be sent to the device 32 via a link, such as the Internet or a wireless or wired network. The text can be in text format or annotated in an extensible markup language (XML). Alternatively, the text may be in the form of a hard copy document which is scanned and OCR processed by a scanner (not shown).

The exemplary user interface 30, here illustrated as a graphical user interface (GUI) allows a user to interact with the system 12, view annotated text, conduct information extraction searches, or the like. An exemplary user interface is described, for example, in above-mentioned U.S. Pub. No. 20070179776, incorporated by reference.

The NER system 16, or a preprocessing component (not shown) which may be a part of system 12, converts input text 14 to a sequence of tokens and performs named entity extraction thereon (e.g., by accessing a lexical source, such as NE database 46 or an online resource) to identify named entities in the input text. The NER system 16 may also assign a semantic type (context) to each of the extracted named entities.

In general, each text 14 to be processed comprises one or more text strings expressed in a natural language having a vocabulary and a grammar. Each text string can be as short as a phrase or clause of a sentence and generally comprises a sentence, although it is also completed that a text string may comprise two or more contiguous sentences. An input text may be a document which generally includes a plurality of text strings each comprising a plurality of text elements, such as words, phrases, numbers, and dates, or combinations thereof. In the case of input XML documents, the searchable text strings may include hidden text. The exemplary text processing apparatus 10 transforms the input text into a body of annotated, searchable text, which includes information on named entities. In particular the output text is annotated with tags, such as HML tags, metadata, a log file, or direct annotations, identifying confirmed named entities. As will be appreciated, a variety of other annotations may also be applied to the document before it is output. The input text 14 may be stored prior to and/or during processing in the memory 36.

The memory 36 may be implemented using any appropriate combination of alterable, volatile or non-volatile memory or non-alterable, or fixed, memory. The alterable memory, whether volatile or non-volatile, can be implemented by using any one or more of static or dynamic RAM, a floppy disk and disk drive, a writeable or rewriteable optical disk and disk drive, a hard drive, flash memory or the like. Similarly, the non-alterable or fixed memory can be implemented using any one or more of ROM, PROM, EPROM, EEPROM, and gaps in optical ROM disk, such as a CD ROM or DVD ROM disk and disk drive, or the like. The processor 34 can be a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In one embodiment, the memory 36 and processor 34 are combined in a single chip. The exemplary memory 36 stores instructions executed by the checking system 12 and as well as the original document 14, annotated document, annotations generated during the processing Annotated documents may be stored in a database, such as a relational database, where they can be queried with SQL language queries, or as an enriched XML file. The annotated documents may be indexed according to the named entities identified therein. The annotation preserves the inner grammatical structure of the text string, allowing for a fast search. The database can be located in any suitable storage medium, such as a disk, hard drive, Internet server, or the like. Along with XML, other structured formats that include structuring schema or other explicit organization can be used to provide a common structured document format for the annotated documents.

Figure 2:
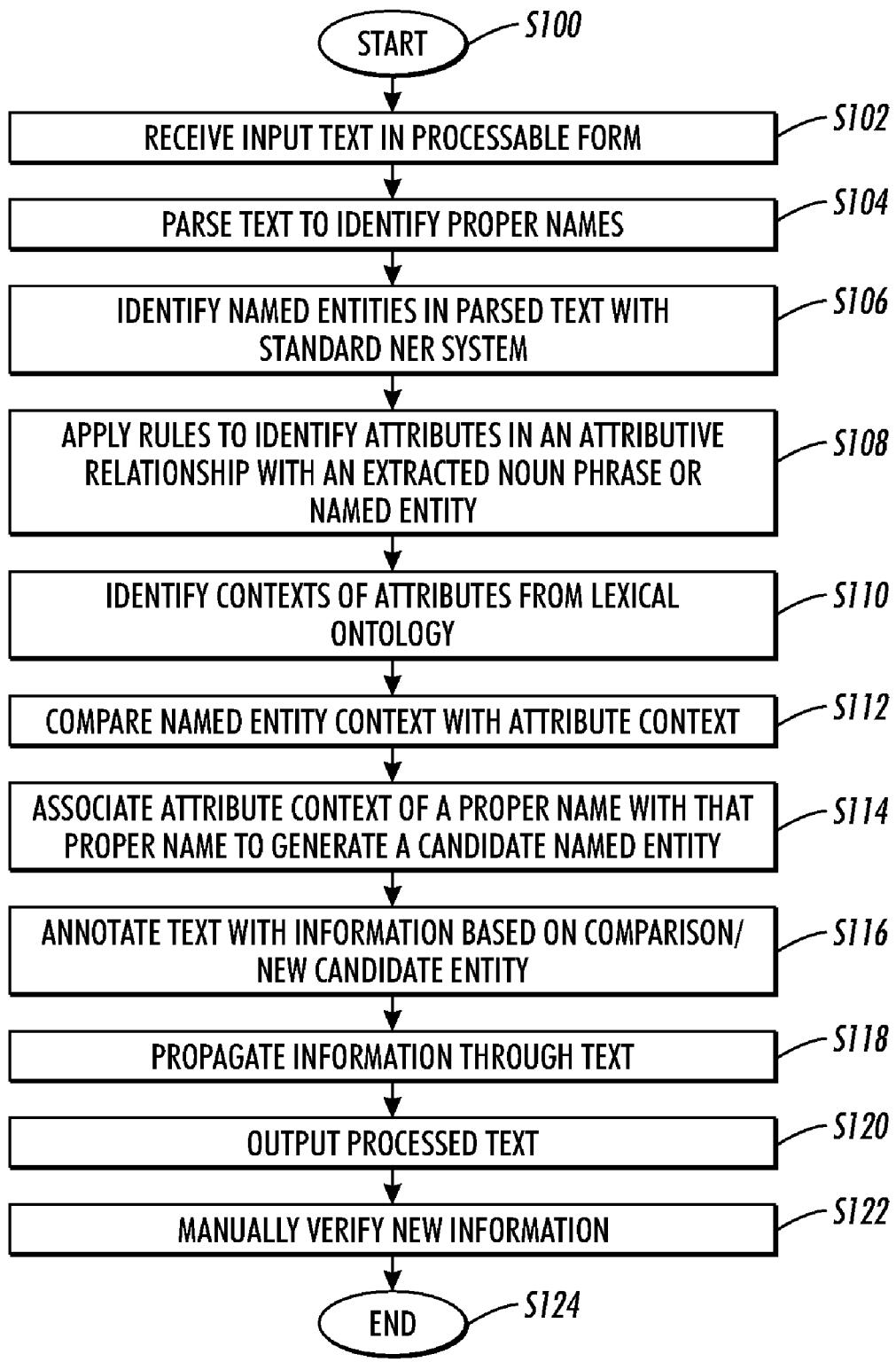
FIG. 2 illustrates a method for processing text in accordance with another aspect of the exemplary embodiment.
Figure 3:
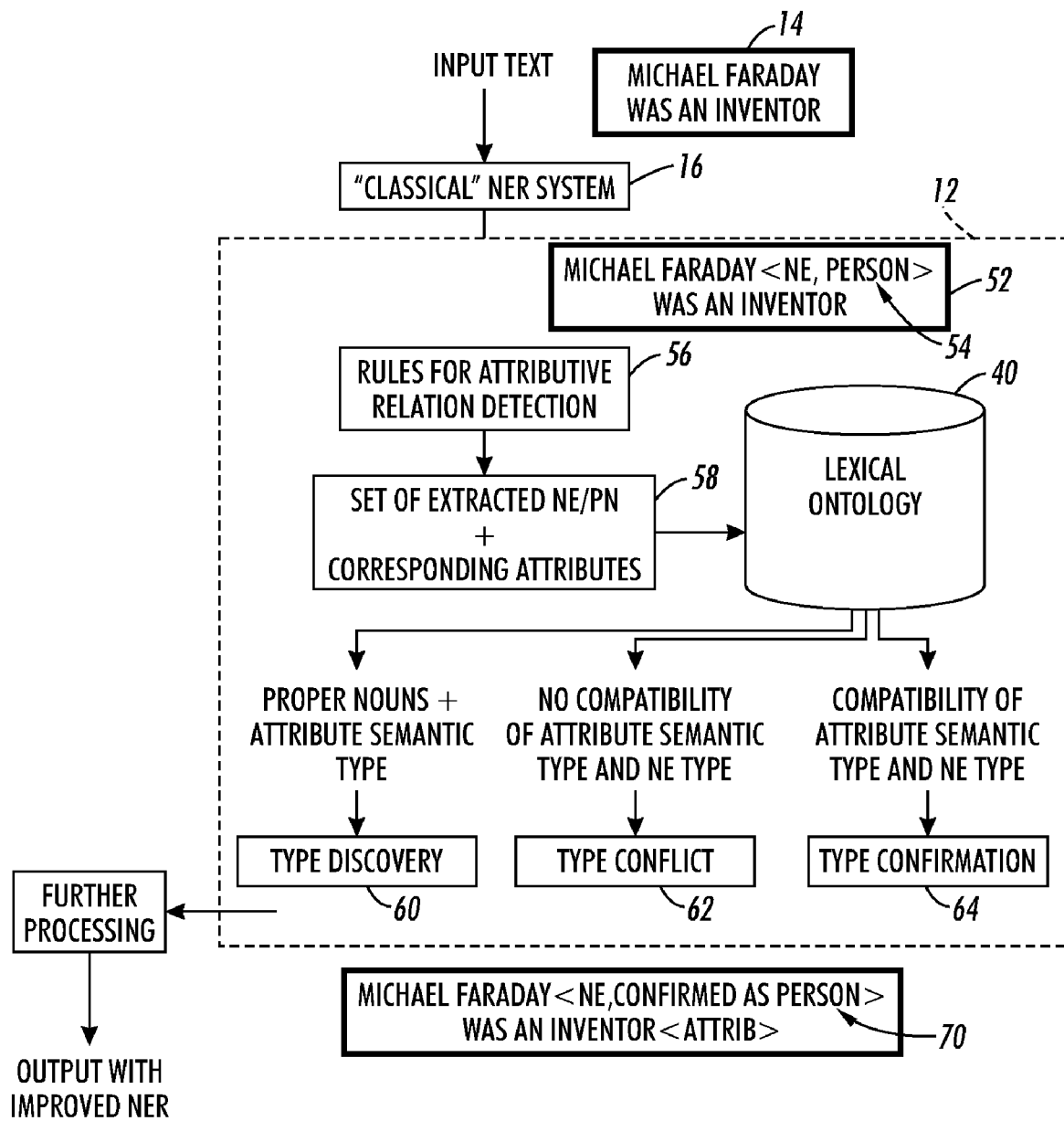
FIG. 3 graphically illustrates steps of the exemplary method.

With reference to FIG. 2, an exemplary method for named entity checking is shown. FIG. 3 illustrated graphically one example of the exemplary method. The method can include fewer, more, or different steps to those shown and need not proceed exactly in the order specified. The method begins at S100.

At S102, text 14 to be processed is input/received in a suitable format for processing. If the text is not in a form in which it can be processed by the checking system 12 (e.g., a hardcopy document), it may be converted to a suitable form, e.g., by OCR processing of a scanned document.

At S104, each input text string is parsed to identify a sequence of tokens, each token in a string of tokens including a text element, such as a word. Lexical information is associated with the words, such as noun, verb, etc. Proper names are also identified, for example by operation of rules. For example, the rules identify capitalized words which serve as nouns but which are not in a lexicon of recognized common nouns. Some or all of these identified proper names may be designated as candidate named entities. Some of this processing may be performed at a later stage or repeated on refined text.

At S106, named entities in a selected text string are identified by NER system 16. For example, candidate named entities which match text elements in the text string are first retrieved, e.g., based on an entry in an associated database or from a lexical resource such as Wikipedia, or from named entity database 46, if the lexicon is configured for identifying named entities. Grammar rules and/or statistical techniques may be applied to filter the candidate named entities. The NER system 16 may assign a semantic type (context) to each of the recognized named entities from a finite set of contexts, e.g., in the form of tags. In general, each named entity is assigned only a single context. In a few instances, where more than one context is assigned to an NE, this means that the NER system 16 has not been able to unambiguously assign a single context. The contexts may be identified from the lexical resource, lexicon, and/or by application of rules. The text 52, with original information 54 (FIG. 3) regarding any identified named entities and their contexts, is output by the NER system 16. The original information 54 may be in the form of tags, e.g., XML tags, meta data, log files, or the like. Any of the proper names identified at S104 which are not designated as named entities by the NER system may be tagged or otherwise identified as being proper names, either by the NER system 16 or by proper name identifier 18.

At S108, rules 56 for attributive relation detection are applied to the NER processed text. In particular, the attribute identification component 20 applies one or more rules for identifying an attribute which is in an attributive relationship with an identified named entity or a proper name. The output 58 of this step is a set of extracted NE/PNs and their corresponding attributes.

At S110, one or more contexts for each identified attribute which is in an attributive relation with a named entity or proper name are identified. The contexts for the attributes may be identified from the lexical ontology 40, e.g., by looking up the attribute and storing its assigned context in memory 36. Each of the attribute contexts generally refers to a sense in which the attribute can be used when the attribute is being used as a noun. Thus for example, the attribute "conductor" may be classified as having the three contexts for its use as noun: "person," "substance," and "artifact." It should be noted that some contexts may cover more than one sense.

At S112, for attributive relations in which the nominal entity is an NE, the attribute context(s) and corresponding NE context are compared to determine whether they are comparable or not, i.e., whether there is a match or otherwise a conflict.

At S114, for attributive relations in which the nominal entity is a PN (i.e., has no associated context), the context(s) of the attribute are associated with the PN, e.g., as tags or other form of information.

At S116, based on the comparisons at S112 and/or contexts assigned to the PNs at S114, the text may be processed to associate information with the existing named entities and/or to identify new named entities. For example the tags of the existing named entities may be confirmed (where compatible) or corrected, and proper names may be identified as new named entities in a class which is based on the associated attribute's context.

At S118, the information on any new named entities and/or any conflicts identified for the named entities may be propagated throughout the text. Similar instances of proper names newly recognized as named entities can thus be identified by semantic type.

At S120, the processed text 70 is output, together with its annotations. At S122, an optional manual verification of the system output may be performed.

The method ends at S124. As will be appreciated, each of the above steps, with the exception of optional step S122, can be performed without manual input, i.e., performed completely automatically by the exemplary apparatus 10 shown in FIG. 1.

Further details of the exemplary system and method now follow.

Robust and Deep Parsing

In the exemplary checking system 12, a parser, such as an incremental parser capable of performing robust and deep syntactic analysis, can be adapted for processing the text. An exemplary parser which can be adapted to the identification of attributes is the Xerox Incremental Parser (XIP), as described, for example, in U.S. Pat. No. 7,058,567 to Ait-Moktar, incorporated herein by reference in its entirety, and in Aït-Mokhtar S., Chanod, J. P., Roux, C. "Robustness beyond Shallowness: Incremental Dependency Parsing," Special issue of NLE journal (2002) (hereinafter "Aït-Mokhtar 2002"); Aït-Mokhtar, et al. "Incremental Finite-State Parsing," Proceedings of Applied Natural Language Processing, Washington, April 1997; and Aft-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

Natural language processing is typically performed in three distinct processing layers: a lexical processing layer, a syntactical processing layer, and a semantic processing layer.

At the lexical stage, the linguistic input is broken by the parser into base constituent parts, typically including words and punctuation. Each word, punctuation mark, or other element is typically referred to as a token. Generally, the parser first assigns features to the identified text fragments, e.g., by applying finite state transducers. Specifically, an attempt is made to associate each word or token with lexical information contained in a lexicon. The lexicon includes morpho-syntactic information, semantic information, and associated parts of speech. Such token association at the lexical stage is referred to as morphological analysis. In particular, the parser includes a morphological module or "lemmatizer" which associates features from a list of features, such as indefinite article, noun, verb, and other parts of speech, with each recognized word or other text element in the document. This module may thus attach tags to a sentence which identify the grammatical parts of the sentence. Some words may have more than one label for example the word master may be a verb and a noun. The lexical layer generally operates on tokens individually, without taking into account the surrounding context, that is, the surrounding tokens. Accordingly, there is often substantial ambiguity remaining after the lexical processing, which can be at least partially resolved, e.g., by statistical or other techniques.

At the syntactical layer, the tokens are processed with consideration given to contextual information. Thus, for example collocations are identified by recognizing paired tokens (such as "fly" followed by "wheel"), and this additional contextual information is employed to narrow the word morpho-syntactic analysis and part of speech. The syntactical processing is sometimes broken down into a disambiguation level that takes into account the word definitions, and a context-free grammar level that takes into account syntactical categories (such as looking at sequences of parts of speech or higher level constituents) without otherwise considering word meaning. Such a grammar is sometimes referred to as an augmented context-free grammar. The grammar is usually described by rewriting rules. Each rewriting rule associates a higher level constituent with an ordered sequence of lower level constituents.

The semantic layer, or deep syntactic analysis, may include the construction of a set of syntactic relations (dependencies) from an input text by application of a set of parser rules. These rules identify a relationship for a pair of text elements. Exemplary methods are developed from dependency grammars, as described, for example, in Mel'čuk I., "Dependency Syntax," State University of New York, Albany (1988) and in Tesnière L., "Elements de Syntaxe Structurale" (1959) Klincksiek Eds. (Corrected edition, Paris 1969). These rules can be adapted by adding a specific set of rules designed to identify attribute relationships and the pairs (NE/PN, attribute) in those relationships.

As will be appreciated, rather than processing all the text, a dedicated system 12 may be employed which includes a more limited set of rules dedicated primarily to the exemplary methods disclosed herein.

Named Entity Extraction

The first main step (S106) of the method is to extract named entities with a classical named entity recognition system (NER) 16. Such a system usually associates a predefined semantic type to the entity, such as PERSON, LOCATION, ORGANIZATION, DATES, etc. The NER system may take, as input, a tokenized and optionally morphologically analyzed input text string or body of text, and output information on any named entities identified. The NER system 16 can comprise any suitable automated name entity recognition system, as described, for example, in above-mentioned U.S. Pat. Nos. 7,171,350; 6,975,766, and 6,311,152. NER systems which employ statistical methods for filtering identified named entities which may be used herein are described, for example, in Andrew Borthwick, John Sterling, Eugene Agichtein, Ralph Grishman, "NYU: Description of the MENE Named Entity System as Used in MUC-7." In Proc. Seventh Message Understanding Conference (1998). Symbolic Methods which may be used are described in R. Gaizauskas, T. Wakao, K. Humphreys, H. Cunningham, Y. Wilks, "University of Sheffield: Description of the LaSIE System as Used for MUC-6". In Proc. Sixth Message Understanding Conference (MUC-6), 207-220 (1995). Caroline Brun, Caroline Hagège, *Intertwining deep syntactic processing and named entity detection*. ESTAL 2004, Alicante, Spain, Oct. 20-22 (2004), provides an example of a NER system which is combined with a robust parser, which may be used herein.

Attribute Identification

The second main step of the method (S108) includes collecting, from the text, attributes that are associated with named entities (NE) extracted previously or unlabeled proper nouns (PN). This is done by parsing the text with a dedicated grammar which extracts attributive syntactic relations that link a NE or PN with a corresponding nominal attribute. Such attributive relations can be any syntactic relations that correspond semantically to a loose ISA relation. A loose ISA relation can be described as loosely corresponding to "X is a Y" where X is the NE or PN and Y is the nominal attribute, as for example in:

(1) John was an inventor
(2) John Smith, the inventor, made a presentation
(3) John Smith, as the inventor of the process, was awarded.
(4) John Smith is expected to be an inventor.
(5) They consider John Smith an inventor.
(6) The inventor John Smith was awarded . . . .
(7) An inventor called John Smith was awarded . . . .
(8) John Smith, who is a great inventor, was awarded . . . .

In all these example sentences, there is an attributive relationship between "John Smith" and "inventor". For these, and other examples herein, the named entity or proper noun is shown in bold and the linked attribute is underlined. The exemplary attribute relationship grammar rules may be constructed to identify some or all of these types of loose ISA relations and optionally additional ones not exemplified here. Some of the grammar rules which may be constructed to identify attributive relationships, for example, may thus include identifying an instance of the verb "to be" (e.g., is, was, will be) and its complement (inventor in the examples), and establishing an attributive relation between the subject (NE/PN) of the verb and the complement. Other rules look for specific instances of other verbs which are indicative of an attributive relationship, such as called, considered, etc.

In the examples above, there is a close proximity between the nominal entity and its nominal attribute. However, as will be appreciated, such a close proximity is generally not required for the rules to be able to detect the attributive relation. In general, the NP/PN and linked attribute appear in the same sentence. However, it is also contemplated that more distant relationships could be identified by anaphoral resolution. For example, for the text string "John Smith made a presentation. He is an inventor." "he" could first be tagged as corresponding to "John Smith" by anaphoral resolution and thereafter a link established between "he" and "inventor," which is subsequently used to identify information about "John Smith." Identification of Attribute Concepts The third main step (S110) of the method includes a lookup of the nominal attribute in the lexical ontology (such as Word-Net), in order to associate a concept to the nominal attribute. As noted above, attributive relations correspond to "ISA" relations. Accordingly, the same concept can be associated with the named entity (or proper noun). For example, consider the text string:

The Boeing 747, commonly nicknamed the "Jumbo Jet", is a long-haul, widebody commercial airliner manufactured by Boeing.

Here, there is an attributive relation between "Boeing 747" and "airliner". If, according to the lexical ontology, "airliner" belongs to a given semantic context, the system 12 associates this context to the related named entity "Boeing 747".

Exemplary concepts which can be associated with the attribute, are those used by WordNet as its Top semantic concepts for nouns, as follows:

| Concept | General Description of Concept |
|---|---|
| noun.act | nouns denoting acts or actions |
| noun.animal | nouns denoting animals |
| noun.artifact | nouns denoting man-made objects |
| noun.attribute | nouns denoting attributes of people and objects |
| noun.body | nouns denoting body parts |
| noun.cognition | nouns denoting cognitive processes and contents |
| noun.communication | nouns denoting communicative processes and contents |
| noun.event | nouns denoting natural events |
| noun.feeling | nouns denoting feelings and emotions |
| noun.food | nouns denoting foods and drinks |
| noun.group | nouns denoting groupings of people or objects |
| noun.location | nouns denoting spatial position |
| noun.motive | nouns denoting goals |
| noun.object | nouns denoting natural objects (not man-made) |
| noun.person | nouns denoting people |
| noun.phenomenon | nouns denoting natural phenomena |
| noun.plant | nouns denoting plants |
| noun.possession | nouns denoting possession and transfer of possession |
| noun.process | nouns denoting natural processes |
| noun.quantity | nouns denoting quantities and units of measure |
| noun.relation | nouns denoting relations between people or things or ideas |
| noun.shape | nouns denoting two and three dimensional shapes |
| noun.state | nouns denoting stable states of affairs |
| noun.substance | nouns denoting substances |
| noun.time | nouns denoting time and temporal relations |

Illustrative Example

The following example illustrates the rule application and context identification steps (S108 and S110). In this example, the sentence: The yogurt is called Activia is to be processed.

Step 1: From the NER system, "Activia" is unknown (i.e., not identified as an NE) and in upper case, so a feature proper: + is added to the noun "Activia"

Step 2. Apply rule:

if (VDOMAIN[passive](#1[sc_np_nppred],#2) & ^OBJ[post](#1,#3))
then OBJCOMPL[post](#1,#3)

This rule has the effect of creating the relation OBJ-COMPL (called, Activia) from previous information computed by the parser.

Step 3: Apply rule:

if (SUBJ[relativ:~](#1,#2) & ((VDOMAIN[passive](#3,#1) & #1 < #3) |
VDOMAIN[passive](#3,#1)) & ~OBJ[infinit,post](#3,?))
then OBJ-N(#3,#2)

This rule has the effect of creating the relation OBJ-N (called, yogurt) from previous information computed by the parser.

Step 4: Apply rule:

if ( OBJ-N(#1,#2) & OBJCOMPL(#1,#3))
then ATTRIB(#2,#3)

This rule has the effect of creating the relation ATTRIB (yogurt, Activia) from the relations extracted in the steps 2 and 3 above.

Step 5: Apply rule:

| NP{?*,#1[proper:+]} |
if ( ~ENTITY(#1))
then ENTITY(#1)

This rule has the effect of marking the proper noun "Activia" as a candidate untyped Named Entity: ENTITY (Activia). In this example, the grammar has calculated the relations ENTITY (Activia) and ATTRIB (yogurt, Activia)

In a parallel or subsequent step (S110), WordNet information enables the noun "yogurt" to be marked with a feature: FOOD: +, corresponding to the concept: noun.food. So, it can be inferred that "Activa" should be also be of semantic type FOOD.

Comparing Named Entity Concepts to Attribute Concepts (S112)

In one embodiment, the set of attribute contexts may have a one to one correspondence with the set of NE contexts. Thus, a match may be found if the NE context is identical to an attribute context. Where there is not such a one to one correspondence between attribute contexts and NE context, rules may be established for determining which, if any, of the attribute contexts correspond(s) to a particular NE context and vice versa. Thus, for example, NE contexts "men" and "women" may both be defined as matching the attribute concept "people."

As will be appreciated, for any pair (NE, attribute) there may be more than one attribute concept identified from the lexical ontology 40 and in cases of ambiguity, there may be more than one NE concept identified. Thus, rules may be established to account for cases where only one of the attribute concepts matches the NE concept, or vice versa. Different types of features can be used to identify the different cases.

In one embodiment, when the concept (semantic type) of the named entity and the concept (semantic type) of the attribute are compared, the following two cases may be considered: 1. no context ambiguity, and 2. context ambiguity, as follows:

1. There is only one concept for the attribute (no word-sense ambiguity) and one NE concept (or a PN without a concept). Here three cases 60, 62, 64 (FIG. 3) can be considered:

a. TYPE CONFIRMATION—The semantic type of the attribute is compatible with that of the named entity in relation with it, as in:

Poehl has had to switch to the hard line promoted by his deputy, Helmut Schlesinger, jacking up interest rates to fight inflationary fears and abandoning the pragmatic policies he had pursued so far this year to promote currency stability.

Here, there is an attribute relation identified between deputy and Helmut Schlesinger. Assuming that Helmut Schlesinger is considered as a named entity of semantic type PERSON (or MAN, which is considered compatible with PERSON) by the NER general system, and deputy has only one semantic type (using the supertypes in WordNet, as an example) which is also PERSON, then, the two arguments of the attributive relation are compatible, and the tagging of the entity is considered as correct.

b. TYPE CONFLICT—The semantic type of the attribute is not compatible with that of the named entity in relation with it, as in:

The warship is called the Armando Diaz.

In this example, the entity Armando Diaz is recognized as person name by the NER system 16 (this would be the case for many existing NER systems as Armando is a first name). At the same time, this named entity is in attributive relation with warship. In a lexical ontology, such as WordNet, the concept for the word warship is generally unambiguous (only one sense). For example, WordNet lists its supertype as "ARTIFACT". Hence, the system can safely propose an alternative to the "PERSON" tag which was previously associated to Armando Diaz, namely the "ARTIFACT" tag. In this case, the type tag of the NE Armando Diaz that was given by the NER system was incorrect, and the non ambiguous context of the attribute can be proposed as an alternative, either through tagging or by interactively proposing the context to a reviewer, e.g., via the GUI.

It may also be noted that under TYPE CONFLICT, some cases of metonymic uses of NEs are identified. Metonymy is a form of figurative speech, in which one expression is used to refer to the standard referent of a related expression. For example, named entities, such as the names of persons, organizations, and locations, have a literal meaning and are frequently used in that sense. Beyond their literal meaning, however, named entities are also frequently subject to metonymy. Named entities can thus refer to other concepts than the standard referent. For further details on metonymy extraction, see for example, above-mentioned U.S. application Ser. No. 11/846,740, incorporated by reference, and Caroline Brun, Maud Ehrmann, Guillaume Jacquet. "*A hybrid system for named entity metonymy resolution.*" ACL-SemEval 2007, 4th International Workshop on Semantic Evaluations, Prague, Jun. 23-24 (2007). The present system thus may find application in a hybrid named entity resolution system as described therein, or alternatively, such a hybrid named entity resolution system may be incorporated into the present system as further confirmation of metonymic use.

For example, in the sentence:

The article reported that the Bank of Santander is BBV's "principal rival" in the upcoming takeover bid for Banesto.

Assume that the text element Bank of Santander is recognized by the NER system as an NE of context type ORGANIZATION. Without any further contextual information, this would generally be the case for existing NER systems. However, in this particular case, Bank of Santander is employed in a metonymic sense, of type PERSON (more precisely, group of persons). This semantic shift in usage is detected under TYPE CONFLICT. This is because the attribute rival is associated with the NE Bank of Santander by the attributive grammar. Additionally, the specialized lexicon (WordNet) states that the noun rival has unambiguously one semantic type "PERSON". Accordingly, this case of metonymic sense shift (ORGANIZATION→PERSON) is detected under the TYPE CONFLICT case.

For example, when the attribute context is a PERSON type of attribute, and the identified context of the named entity with which there is a conflict is an ORGANIZATION or LOCATION type of context, that entity may be labeled or otherwise identified as potentially having a metonymic use in the text string.

As will be appreciated, if the NER system is able to correctly handle this kind of metonymic use and correctly identify it, then this example will fall under the TYPE CONFIRMATION case, presented above.

Detection of metonymic use is advantageous, for example for information searching of queries of the "who is" or "what is" type. For who type questions a search engine will look for instances of named entities tagged as PERSON, while for what type questions, the search engine is more likely to look for instances of named entities tagged as ARTIFACT. Thus, having Bank of Santander in the above example sentence tagged as a metonymic use, i.e., PERSON, allows such a sentence to be retrieved in an appropriately worded who type of query. If it is only tagged with ORGANIZATION and not PERSON, it will likely not be retrieved by the search engine.

c. TYPE DISCOVERY—This case applies to proper names, specifically, to a named entity has not been recognized as such by the NER system 16, as in:

Activia is yogurt, but not just any yogurt.

Assume that the proper noun Activia has not been recognized as a named entity by the NER system, but only as a proper noun. This is generally the case for a general purpose NER system which has not been enhanced with domain specific named entities. The word Activia is in attributive relation with the word yogurt. According to WordNet, yogurt has the unambiguous type "FOOD". In this case, the checking system 12 can tag or propose to tag Activia as a named entity by attaching a new tag, "FOOD", to the proper noun.

In both the TYPE CONFLICT and TYPE DISCOVERY cases, once this information has been detected by the system for one sentence, it can easily be propagated to the rest of the document. For example, the text may also include the sentence:

Today Activia is available in 36 countries thanks to a very large range that goes from kefir-type fermented yogurt to laban in Russia and Saudi Arabia.

Here, Activia is also tagged using the label "FOOD".

2. The context of the attribute is ambiguous, as in
Keene is a conductor, trained at Juilliard, he has led the Voices of Ascension through many outstanding.

In this example, Keene has been identified as a proper name or named entity. However, the nominal attribute "conductor" is ambiguous as to context. For example, according to WordNet, the following four noun semantic types are found, covering three contexts, PERSON, SUBSTANCE, and ARTIFACT:

---

<noun.person>: conductor, music director, director (the person who leads a musical group)
<noun.substance>: conductor (a substance that readily conducts e.g. electricity and heat)
<noun.person>: conductor (the person who collects fares on a public conveyance)
<noun.artifact>: conductor (a device designed to transmit electricity, heat, etc.)

---

In one embodiment, where precision of results is a high requirement (i.e., it is desirable for each instance of a named entity which is recognized to be correctly tagged), the only action performed for this case is to check whether there is compatibility between at least one of the set of WordNet noun supertypes (Top concepts) and the context of the named entity. If there is no intersection between the attribute contexts and the NE context, a conflict is detected. This may be flagged by tagging the text accordingly or by interactively presenting the conflict to a user for resolution. Otherwise (i.e., there is compatibility between one of the attribute contexts and the NE context), nothing is done in order to avoid introducing errors by the checking system 12.

In general the cases of ambiguity can be kept quite low by using a certain degree of generality in the lexical semantic hierarchy. For example, only the approximately 25 supertypes (Top concepts) are used in the case of WordNet and a relatively small number of concepts for the named entity, which can be combined, if needed into higher level contexts. Further, as only WordNet's noun semantic typing is considered, the ambiguity remains quite low as demonstrated in the Examples below.

Named Entity recognition is of interest for a wide variety of applications, like question answering, fact extraction, etc. The exemplary system that enables verification, correction and discovery of named entity semantic types is applicable to all of these applications. Moreover, domain specific applications, such as, for example, the legal domain (litigation) and the medical domain, would also benefit from the discovery of non-standard NE types and from the discovery of unrecognized named entities. Specific domains are indeed highly productive in "new" types of named entities, generally uncovered by standard named entity systems. In such cases, it would be of benefit to design the system using a domain specific lexical ontology rather than or in addition to a more general lexical ontology 40, such as WordNet.

The exemplary system 12, since it detects conflicts (TYPE CONFLICT), can be useful in evaluating the adequacy of a standard NER system 16 for a given corpus. For example, a high percentage of conflicts could indicate that the NER system 16 is not appropriate for a given corpus.

The method illustrated in FIGS. 2 and 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 2, can be used to implement the method for named entity resolution.

Without intending to limit the scope of the exemplary embodiment, the following examples demonstrate the applicability of the system to processing text from different corpora.

EXAMPLES

Example 1

XIP-Based Prototype

In order to demonstrate the applicability of the system 12, a prototype was built that makes use of the XIP engine (discussed in Aït-Mokhtar 2002) and normalization grammar, coupled with information gathered from the WordNet lexical ontology. See Hagège C., Roux C., *Entre syntaxe et sémantique: Normalisation de l'analyse syntaxique en vue de l'amélioration de l'extraction d'information*. Proc. TALN 2003, Batz-sur-Mer, France (2003) for a fuller description of the normalization grammar rules applied by the system.

The XIP normalization grammar, as adapted to the present system 12, extracts deep syntactic relations, among which the attributive relation. For the prototype, attributive relations in XIP correspond to syntactic subject complement, nominal apposition, and even expression of beliefs. All these syntactic links correspond, as discussed above to a semantic ISA relation. Since a dependency parser is used, even long distance attributive relations can be captured, as in:

Shown are results obtained with mRNA from one representative population of normal and keloid fibroblasts with probes TIMP 1 in comparison to GAPDH, which has been considered as house-keeping gene.

Here, an attributive relation is extracted between GAPDH and gene. The XIP normalization grammar also integrates "standard" named entities recognition, i.e., serves as NER system 16. See, for example Caroline Brun, Caroline Hagège, *Intertwining deep syntactic processing and named entity detection*. ESTAL 2004, Alicante, Spain, Oct. 20-22 (2004) for a fuller description of the way in which such rules are integrated.

WordNet contains a total of 53800 nouns. For ease of evaluation, a subset of the nouns in WordNet was used. Specifically, all the WordNet nouns having a supertype (person, artifact, substance, etc.) which is not ambiguous as to context are first extracted, for example:

```
girl [5 senses] → noun.person
ship [1 sense] → noun.artifact
drug [1 sense ] → noun.artifact
liquidation [3 senses] → noun.act
```

This provides a vocabulary of 44406 nouns. (As will be appreciated, in another implementation, the entire vocabulary of nouns could be used). The semantic supertype of these words is integrated into XIP lexicons as the context. Then the normalization grammar is used to filter attributes of named entities or proper nouns that belong to one of the encoded super types. According to the compatibility checking presented above, tag correction for already recognized named entities and tag discovery for non-recognized named entities are applied.

Here is an example of output of the checking system 12 on the following input text:

Glaxo SmithKline (GSK) is set to launch the cardiovascular drug Carvedilol, a cardiovascular drug from Swiss drugmaker Roche, in the next two months.

GSK said it would launch Carvedilol in a couple of months and is also in discussions with Japanese and American companies for similar deals.

The company already has an agreement with Japanese firm Eisai for the gastric ulcer drug Rabeprazole.

Only the named entities and attributive relations are shown in this Example. Those proposed by the exemplary checking system 12 appear in bold. The format of dependencies corresponding to the information given by the system is:

```
TYPE_WordNet-Super-Type(attribute,NE|PN) .
1> Glaxo SmithKline (GSK) is set to launch Carvedilol, a
cardiovascular drug from Swiss drugmaker Roche, in the
next two months.
ORGANIZATION(GSK)
ORGANIZATION(Glaxo SmithKline)
ORGANIZATION(Roche)
ENTITY(Carvedilol)
ATTRIB(Roche,drugmaker)
ATTRIB(Carverdilol,drug)
DISCOVERY_ARTIFACT(drug,Carvedilol+proper)
```

In the first sentence, "Carvedilol" is a new named entity discovered as an ARTIFACT according to WordNet (because "drug" is an ARTIFACT according to WordNet)

```
2> GSK said it would launch Carvedilol in a couple of
months and is also in discussions with Japanese and
American companies for similar deals.
ORGANIZATION(GSK)
ENTITY(Carvedilol)
FRM(companies,Japan)
FRM(companies,America)
OBJ-N(launch,Carvedilol)
DISCOVERY_ARTIFACT(drug,Carvedilol+proper)
```

In the second sentence, because, it has already been discovered for sentence 1 that "Cardevilol" is of type ARTIFACT, this information is simply propagated to the document.

```
3>The company already has an agreement with Japanese
firm Eisai for the gastric ulcer drug Rabeprazole.
ORGANIZATION(Eisai)
ATTRIB(Eisai,firm)
ENTITY(Rabeprazole
ATTRIB(Rabeprazole,drug)
COMPAT_GROUP(firm,Eisai+org)
DISCOVERY_ARTIFACT(drug,Rabeprazole+proper)
2>TOP{SC{NP{The company} FV{already has}} NP{an
agreement} PP{with NP{Japanese firm Eisai}} PP{for
NP{AP{gastric} ulcer drug}} NP{Rabeprazole} .}
```

In the third sentence the organization "Eisai" is found compatible with the WordNet super type GROUP, and "Rabeprazole" is discovered as an ARTIFACT also.

The following sentence gives another example, illustrating incompatibility of contexts:

```
French President Jacques Chirac on 15 February ordered
the return of French ship Clemenceau back to domestic
waters, citing concerns regarding the hazardous waste
contents of the vessel that had been sent to India for
dismantling.
DATE(15 February)
PERSON(French President Jacques Chirac)
PERSON(Clemenceau)
LOCORG_COUNTRY(India)
ATTRIB(Clemenceau,ship)
CONFLICT_ARTIFACT{ship,Clemenceau+person)
```

"Clemenceau" has been recognized as a PERSON by the standard named entity detection system 16, however there is a conflict of semantic types since WordNet associates the tag ARTIFACT to "ship", which is flagged with the CONFLICT tag.

Using this prototype system, experiments were performed on different kinds of corpora, in order to evaluate the results, as illustrated below.

Example 2

General Domain Corpus

A large corpus of political news of 426 Megabytes was used for this example. The exemplary method was applied to this corpus. The classical NER system 16, which is first applied to the text, is designed to recognize five named entity contexts: LOCATION, ORGANIZATION, EVENT, PERSON and DATES. This particular NER system 16 has been previously evaluated (see Maud Ehrmann. *Evaluation d'un Système d'extraction d'Entités Nommées*. Rapport de stage DESS Texte, Nancy (2004)). It generally performs with a precision of 90.5% and a recall of 89%. Precision is the number of correct named entities identified by the system over the number of entities identified by the system Recall is the number of correct named entities identified by the system over the total number of entities present in the corpus. Together with this classical NER 16, the specific attributive grammar 56 is applied and semantic type checking on the NEs is then performed. The type checking involved 81,893 annotated elements (NE or PN).

For this set of annotated elements, 19,119 fall under the case TYPE DISCOVERY (23%), 42,421 fall under the case TYPE CONFIRMATION (52%) and 20,353 fall under the case TYPE CONFLICT (25%).

New semantic types (that were not identified in the general NER system) can be introduced. These are ARTIFACT, OBJECT, POSSESSION, ATTRIBUTE, ACT, and COMMUNICATION. As will be appreciated, these are a direct application of the WordNet hierarchy and these new types are generated in the case of TYPE DISCOVERY or TYPE CONFLICT.

For each case, 100 annotations were randomly reviewed and the precision of these annotations (i.e., if the annotation is correct or not) manually verified. For TYPE DISCOVERY, the precision was 79%, i.e., 79% of the system's propositions are correct (21% incorrect). Included here as correct are the cases of metonymy that were not handled by the general NER system. Among the errors, 3% are likely due to text formation (title which is not delimited and is merged with the following text). Of the rest, the result is likely to be the result of a poorly calculated attributive relation (coordination problems, tagging errors). While the error rate is not insignificant, the opportunity to identify additional named entities has significant advantages in many applications. It is to be expected that the error rate could be reduced by developing a more sophisticated set of attributive grammar rules.

For TYPE CONFIRMATION, a 99% precision is obtained. This high precision score can provide useful information in cases were a high level of precision is required for a given application.

For TYPE CONFLICT, the results are less accurate, only 50% precision. It should be noted that the NER system 16 used already provides a very good score on this kind of corpus, and thus the type correction may not be as useful as for other corpora. Additionally, the majority of correct type corrections are for cases of metonymy. The results suggest that for TYPE CONFLICT cases, an interactive checking may be implemented to make most use of this information.

Example 3

Biological Corpus

The system 12 was applied to a large biological corpus. The system extracts 1931 entities, where 1824 are discovered (TYPE DISCOVER) and 107 are in conflict (TYPE CONFLICT) with the output of the standard NER system 16. No entities have been found compatible. An illustration is given below:

---

(1) Metallothionein (MT) is a ubiquitous, metal-inducible protein with an important role in the homeostasis and in the detoxification of heavy metals.
    ATTRIB(Metallothionein,protein)
    ENTITY(Metallothionein,protein)
    DISCOVERY_SUBSTANCE(protein,Metallothionein+proper)
    0>TOP{SC{NP{Metallothionein} INS{( NP{MT} )} FV{is}} NP{a AP{ubiquitous} , AP{ADJ{metal - inducible}} protein} PP{with NP{an AP{important} role}} PP{in NP{the homeostasis}} and PP{in NP{the detoxification}} PP{of NP{heavy metals}} .}

---

In the above example, Metallothionein is discovered as a SUBSTANCE by the prototype checking system 12.

---

(2) NixA, a high-affinity nickel transport protein, allows synthesis of catalytically active urease when coexpressed with *H. pylori* urease in an *Escherichia coli* host.
    LOCATION(NixA)
    ATTRIB(protein,NixA)

-continued

CONFLICT_SUBSTANCE(protein,NixA+location)
    0>TOP{NP{NixA} , NP{a AP{NADJ{high - affinity}} nickel transport protein} , SC{FV{allows} NP{synthesis}} of catalytically NP{active urease} SC{BG{when} FV{coexpressed}} PP{with NP{*H. pylori* urease}} PP{in NP{an *Escherichia coli* host}} .}

---

Here a conflict has been detected because the standard NER system recognizes NixA as a location (Nixa, Mo.), while the prototype checking system 10 extracts it as a SUBSTANCE.

The precision of the system 12 on this corpus was evaluated. Results are given in the following table:

| Type | Number of occurrences | Precision (%) |
|---|---|---|
| NE Discovery | 1824 | 74 |
| NE Conflicts | 107 | 77 |

In both cases, the precision of the exemplary prototype checking system 12 is high, either on completely new entities or on conflicts. In the case of conflicts, errors are counted when the entity class given by the standard NER system 16 is correct and the one predicted by the prototype checking system 12 is incorrect (4% of the cases), but also when both are incorrect (19% of the cases).

Since WordNet is used as the lexical ontology 40 for the prototype, the semantic types are rather too general for this biological corpus. For handling specialized corpora of this type, a more specialized lexical ontology may be employed in order to have more specific semantic classes. For example, the semantic class SUBSTANCE could be expanded to include several classes.

From Examples 2 and 3, it can be seen that the balance between CORRECTION/DISCOVERY/CONFIRMATION functionalities is very different according to:

The quality of the general NER system 16 and the ability of the general system to deal with named entity metonymy.

The kind of texts that are handled by the system (in new domain texts, confirmation can be absent while discovery is very rich when the entities handled by the domain specific texts are not foreseen in the general system). Moreover, conflict detection seems to be far better on specific domain texts than on general domain texts.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of processing text comprising:
    receiving processed text which has original information associated with it identifying text elements corresponding to named entities and their assigned contexts, the text comprising a text string;
    for the text string, applying at least one grammar rule for identifying an attributive relationship between an attribute and a nominal entity in the text string, the nominal entity comprising at least one of:
        an identified named entity having an assigned context, and an identified proper name which is not identified in the original information as being a named entity;

identifying at least one context for the attribute from a set of contexts;

where the nominal entity is a named entity, comparing the assigned named entity context with the at least one attribute context; and providing for new information to be associated with the text, which is based on at least one of:
the comparison, and
the identified context of an attribute which is identified as being in an attributive relationship with an identified proper name.

2. The method of claim 1, wherein when the entity is a named entity and the at least one attribute context being compared is a single attribute context, the comparison includes determining whether the entity context and attribute context are compatible.

3. The method of claim 2, wherein when the named entity context and the at least one attribute context are determined not to be compatible, the comparison identifies a conflict.

4. The method of claim 3, wherein the new information to be associated with the text comprises a correction to the identified context for the named entity or evidences the existence of the conflict.

5. The method of claim 3, wherein the providing includes identifying the conflict to a user for manual resolution of the conflict.

6. The method of claim 3, further comprising, wherein when the attribute context is a person type of attribute, and the identified context of the entity with which there is a conflict is one of an organization type of context and a location type of context, identifying that entity as having a metonymic use in the text string.

7. The method of claim 1, wherein the at least one attribute context comprises a plurality of attribute contexts and wherein the named entity context and attribute contexts of a named entity and attribute which are identified as being in an attributive relation are determined not to be compatible only when none of the attribute contexts is compatible with the named entity context.

8. The method of claim 1, wherein when the nominal entity is a proper name, the additional information to be associated with the text identifies the proper name as being a discovered named entity.

9. The method of claim 1, wherein the identifying of at least one context for the attribute includes retrieving the at least one context from a lexical ontology in which attributes are indexed based on context.

10. The method of claim 1, wherein the text comprises a plurality of text strings and the method further includes propagating the new information from one of the text strings to another of the text strings.

11. The method of claim 1, wherein the least one grammar rule comprises a set of grammar rules each of which is designed for identifying a loose ISA relationship.

12. The method of claim 1, wherein each of the at least one attribute contexts is a different context from a set of contexts which are all associated with nouns in the lexical ontology.

13. The method of claim 1, further comprising:
prior to receiving of the processed text, receiving text and processing the text with a named entity recognition system to identify the text elements corresponding to named entities and assigning respective contexts from a finite set of contexts.

14. The method of claim 1, further comprising:
annotating the text with additional information based on the comparison.

15. The method of claim 1, wherein the text is received from a named entity recognition system.

16. The method of claim 15, wherein the text comprises a plurality of text strings and the method further includes determining an accuracy of the named entity recognition system based on a set of the comparisons.

17. An apparatus comprising memory which stores instructions for performing the method of claim 1 and a processor, in communication with the memory for executing the instructions.

18. A computer program product comprising a non-transitory recording medium which encodes instructions which, when executed by a computer, perform the method of claim 1.

19. The method of claim 1, wherein the at least one attribute is a nominal attribute comprising a noun.

20. An apparatus for processing text comprising:
an attribute identification component which, for a text string of received text which has information associated with it identifying text elements corresponding to named entities and their assigned contexts, applies at least one grammar rule for identifying an attributive relationship between an attribute and a nominal entity in the text string, the nominal entity comprising at least one of an identified named entity and an identified proper name which has not been identified as a named entity;
a compatibility checker which accesses an associated lexical ontology to identify, for the attribute that is identified as being in an attributive relationship with the entity, at least one context from a set of contexts and, in the case of a named entity, compares the at least one attribute context with the assigned context of the entity; and
an annotation component which annotates the text, based on at least one of:
the comparison, and
the identified context of an attribute which is identified as being in an attributive relationship with an identified proper name.

21. The apparatus of claim 20, further comprising a named entity recognition component which identifies text elements corresponding to named entities and assigns a context to each of the identified named entities form a set of contexts.

22. The method of claim 9, wherein the at least one attribute context is selected from a set of semantic concepts for nouns in the lexical ontology.

23. A method of processing text comprising:
processing text to form processed text which identifies named entities in the text and their corresponding contexts;
for at least one text string in the processed text, applying at least one grammar rule for identifying an attributive relationship between an attribute and a nominal entity in the text string, the nominal entity being at least one of:
one of the identified named entities, and
an identified proper name which is not identified in the processed text as being a named entity;
identifying at least one attribute context for the attribute from a set of attribute contexts;
where the nominal entity is a named entity, comparing the named entity's context with the at least one attribute context; and
where the nominal entity is either a proper name or there is a conflict between the compared named entity's context with the at least one attribute context, associating information with the processed text based thereon.

* * * * *